(12) United States Patent
Lee et al.

(10) Patent No.: US 11,570,063 B2
(45) Date of Patent: Jan. 31, 2023

(54) QUALITY OF EXPERIENCE OPTIMIZATION SYSTEM AND METHOD

(71) Applicant: National Yang Ming Chiao Tung University, Hsinchu (TW)

(72) Inventors: Ta-Sung Lee, Hsinchu (TW);
En-Cheng Liou, Hsinchu (TW);
Yu-Chien Lin, Hsinchu (TW);
Ting-Yen Kuo, Hsinchu (TW);
Ching-Hsiang Lin, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 16 days.

(21) Appl. No.: 17/343,797

(22) Filed: Jun. 10, 2021

(65) Prior Publication Data
US 2022/0286369 A1    Sep. 8, 2022

(30) Foreign Application Priority Data

Mar. 8, 2021  (TW) ................................. 110108150

(51) Int. Cl.
*H04L 29/08* (2006.01)
*H04L 41/5009* (2022.01)
*H04L 41/16* (2022.01)
*H04L 1/00* (2006.01)

(52) U.S. Cl.
CPC ........ *H04L 41/5009* (2013.01); *H04L 1/0026* (2013.01); *H04L 41/16* (2013.01)

(58) Field of Classification Search
CPC ........................... H04L 41/16; H04L 41/5009
See application file for complete search history.

(56) References Cited

U.S. PATENT DOCUMENTS

| 2015/0082345 A1* | 3/2015 | Archer | H04N 21/2668 725/34 |
|---|---|---|---|
| 2021/0409976 A1* | 12/2021 | Ergen | H04W 72/0453 |

\* cited by examiner

*Primary Examiner* — Adnan M Mirza
(74) *Attorney, Agent, or Firm* — Amin, Turocy & Watson, LLP (57) ABSTRACT

A Quality of Experience (QoE) optimization system and method are provided. An electronic device inputs key performance indicators (KPIs) and system control parameters collected from a core network, a base station and a user equipment (UE) into a QoE optimization model. The QoE optimization model then optimizes the system control parameters based on the KPIs and a user QoE fed back from the UE to output optimized system control parameters. Furthermore, a strategy emulator controls at least one of a base station emulator and a UE emulator, so as to emulate the QoE optimization model using the at least one of the base station emulator and the UE emulator. Non-real-time optimization adjustments to the QoE optimization model are made based on the result of the emulation performed by the at least one of the base station emulator and the UE emulator.

10 Claims, 6 Drawing Sheets

QUALITY OF EXPERIENCE OPTIMIZATION SYSTEM AND METHOD

BACKGROUND

1. Technical Field

The present disclosure relates to a Quality of Experience (QoE) optimization technique, and more particularly, to a QoE optimization system and method.

2. Description of Related Art

Most of the existing Quality of Experience (QoE) optimization techniques involve passively waiting for complaints on applications to be raised by users before adjusting system control parameters based on users' complaints using highly complex QoE optimization algorithms. This results in delayed performance adjustments and may severely affects the quality of experience of the users (user experience).

However, since the memory cost of servers has significantly reduced, optimization parameters can be determined by comparing historical (past) channel conditions and load requirements of user equipment (UE) using highly complex QoE optimization algorithms. This is a simple solution, yet there are two major key problems to be resolved. First, appropriate key performance indicators (KPIs) need to be determined in order to precisely reflect the current channel conditions and user requirements. Second, there is a plethora of combinations of channel environment, system settings and user requirements, therefore the QoE for the users and the high-dimensional mapping thereof meant that a suitable method for adjusting the system control parameters cannot be obtained using the conventional comparison or polynomial regression approach. In addition, existing techniques primarily involves periodic collections of network parameters, but fail to take into account the KPIs and the system control parameters, and cannot perform emulation validation or cross validation using emulators.

Therefore, there is a need in the art for an innovative QoE optimization technique that addresses at least one of the aforementioned problems or provides the relevant function(s).

SUMMARY

The present disclosure provides a Quality of Experience (QoE) optimization system and method that improves the user QoE, or takes the KPIs and the system control parameters into consideration, or further pre-trains a QoE optimization model, or performs emulation validation or cross validation on the QoE optimization model using at least one of a base station emulator and a user equipment (UE) emulator.

The QoE optimization system in accordance with the present disclosure may include: an electronic device including at least one QoE optimization model and configured for collecting key performance indicators (KPIs) and system control parameters from at least one of a core network, a base station and a UE, inputting the KPIs and the system control parameters into the QoE optimization model, and optimizing the system control parameters based on the KPIs and a user QoE fed back by the UE using the QoE optimization model for outputting optimized system control parameters; and a strategy emulator, a base station emulator and a UE emulator each respectively connected or in communication with the electronic device, the strategy emulator configured for controlling at least one of the base station emulator and the UE emulator to emulate the QoE optimization model for outputting the optimized system control parameters in the electronic device using the at least one of the base station emulator and the UE emulator, and making non-real-time optimization adjustments to the QoE optimization model for outputting the optimized system control parameters based on a result of the emulation of the QoE optimization model performed by the at least one of the base station emulator and the UE emulator.

The QoE optimization method in accordance with the present disclosure may include: collecting key performance indicators (KPIs) and system control parameters from at least one of a core network, a base station and a user equipment (UE); inputting the KPIs and the system control parameters into at least one QoE optimization model; optimizing the system control parameters based on the KPIs and a user QoE fed back by the UE using the QoE optimization model for outputting optimized system control parameters; controlling, by a strategy emulator, at least one of a base station emulator and a UE emulator to emulate the QoE optimization model for outputting the optimized system control parameters using the at least one of the base station emulator and the UE emulator; and making non-real-time optimization adjustments to the QoE optimization model for outputting the optimized system control parameters based on a result of an emulation of the QoE optimization model performed by the at least one of the base station emulator and the UE emulator.

Detailed descriptions are provided below with specific embodiments being set forth with respect to the appended drawings, such that the aforementioned features and advantages of the present disclosure can become apparent and more fully understood. Additional features and advantages of the present disclosure are discussed in part in the descriptions below, and said features and advantages can be understood in part from the descriptions or learnt from implementation of the present disclosure. It should be understood that both the general descriptions above and the detail descriptions below are provided for illustrative and explanatory purposes and should not be construed as to limit the scope of the present disclosure.

DETAILED DESCRIPTION OF THE EMBODIMENTS

Implementations of the present disclosure are described below by specific embodiments. Those skilled in the art can easily understand other advantages and technical effects of the present disclosure based on the content disclosed in this specification, and also implement or apply other equivalent implementations.

Figure 1:
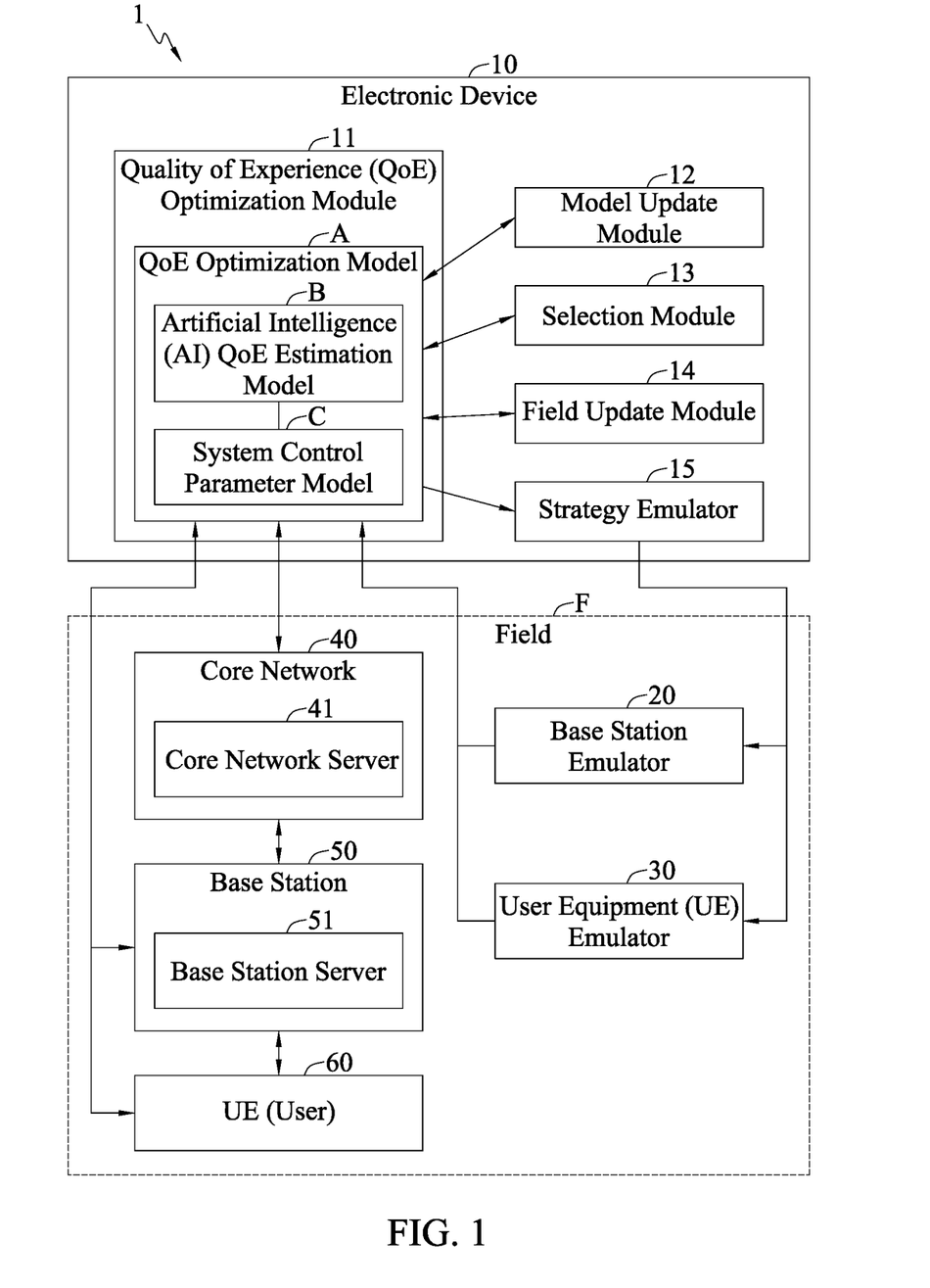
FIG. 1 is a schematic diagram depicting the architecture of a Quality of Experience (QoE) optimization system in accordance with the present disclosure.

FIG. 1 is a schematic diagram depicting the architecture of a Quality of Experience (QoE) optimization system 1 in accordance with the present disclosure. The QoE optimization system 1 can be embodied in, for example, a mobile network communication system, and includes an electronic device 10, at least one strategy emulator 15, at least one base station emulator 20, at least one user equipment (UE) emulator 30, at least one core network 40, at least one core network server 41, at least one base station 50, at least one base station server 51, at least one user equipment (UE) 60, and at least one QoE optimization model A, wherein at least one represents one or more (e.g., two, three, four or more).

The electronic device 10 may include at least one QoE optimization module 11 (the QoE optimization model A), at least one model update module 12, at least one selection module 13, and at least one field update module 14. The strategy emulator 15 may arrange in the electronic device 10, or connected or in communication with the electronic device 10. For example, the electronic device 10 can be a computer, a server (e.g., a cloud server/network server), a host (e.g., a cloud host/network host), etc. The QoE optimization module 11 can be a QoE optimizer, a QoE optimization chip, a QoE optimization circuit, a QoE optimization software, a QoE optimization program, or the like. The model update module 12 includes a model update algorithm, and can be a model updater, a model update chip, a model update circuit, a model update software, a model update program, or the like. The selection module 13 can be a selector, a selection chip, a selection circuit, a selection software, a selection program, or the like. The field update module 14 can be a field updater, a field update chip, a field update circuit, a field update software, a field update program, or the like. The strategy emulator 15 can be an emulator controller or the like.

The QoE optimization module 11 (or the QoE optimization model A) of the electronic device 10 can be connected or in communication with the model update module 12, the selection module 13, the field update module 14, the strategy emulator 15, the base station emulator 20, the UE emulator 30, the core network 40 (the core network server 41), the base station 50 (the base station server 51) and the UE 60, and the strategy emulator 15 can be connected, in communication or in control of at least one of the base station emulator 20 and the UE emulator 30. The core network server 41 may arrange in the core network 40, and the base station server 51 may arrange in the base station 50. The UE 60 can be connected to the base station 50 (the base station server 51) through wireless communication (e.g., a wireless network) so as to be further connected to the core network 40 (the core network server 41). The UE 60 can be a mobile device or a communication device (e.g., a smartphone), a portable device (e.g., a tablet computer/a laptop), a wearable device (e.g., a smartwatch), a personal computer, a desktop computer, or the like.

During the whole process of access and packet switching between the core network 40, the base station 50 and the UE 60, the QoE optimization module 11 (the QoE optimization model A) of the electronic device 10 can collect various different indicators or parameters from the core network 40, the base station 50, and the UE 60. A combination of indicators and one or more parameters (e.g., Parameter Set(t)={Core, gNB, UE}) used in the present disclosure may include feedback data from the core network 40, the base station 50 and the UE 60, wherein t represents time; and Core, gNB, and UE represent a combination of indicators and one or more parameters from the core network 40, the base station 50 (e.g., a 5G base station, or simply gNB), and the UE 60, respectively. For example, the indicators may be KPIs including both Channel Quality Indicator (CQI) and network load indicators; the parameters may be system control parameters and the like.

CQI and the like can effectively reflect the channel conditions of the UE 60, such as CQI (in 4-bit index, 0-15), Reference Signal Received Power (RSRP) (in dBm), throughput (in bits/sec), Rank Indicator (in index), or the like. Moreover, network load indicators and the like may effectively reflect load type demands of the UE 60 and the overall network load, such as the average load (in Mbps/$km^2$), number of active users, session type (in index), or the like. Meanwhile, the overall network performance can be altered by adjusting the system control parameters. For example, the system control parameters may include base station transmission power (in dBm), antenna inclination (in degrees), resource distribution method (in index), or the like.

In other words, the electronic device 10 may collect KPIs and system control parameters from at least one of the core network 40, the base station 50, the UE 60, and input these KPIs and system control parameters to at least one QoE optimization model A. Based on the KPIs and a user QoE optimization system control parameter fed back from the UE 60, the QoE optimization model A can output optimized system control parameters. The strategy emulator 15, the base station emulator 20 and the UE emulator 30 can respectively connect or in communication with the electronic device 10, and the strategy emulator 15 may be in control of at least one of the base station emulator 20 and the UE emulator 30, so as to emulate the QoE optimization model A that is used for outputting optimized system control parameters in the electronic device 10 with at least one of the base station emulator 20 and the UE emulator 30. Based on the emulation results for the QoE optimization model A from the at least one of the base station emulator 20 and the UE emulator 30, the QoE optimization model A for outputting optimized system control parameters can then be optimally adjusted in non-real-time.

The electronic device 10 or the QoE optimization module 11 (the QoE optimization model A) is capable of determining quickly and accurately the optimum adjustments for the system control parameters by comparing KPIs in the historical data and using artificial intelligence (AI) technology to maximize the user QoE. Also, an emulation of the real situation can be provided through validations using at least one of the base station emulator 20 and the UE emulator 30. Moreover, the validation of the real-time strategy emulator 15 and a non-real-time AI QoE estimation model B can be combined to form a new recursion structure. This significantly reduces the difference between the result inferred by the AI QoE estimation model B and the real situation, and the result of emulation of the at least one of the base station emulator 20 and the UE emulator 30 can be used as new reference data for training data for the AI QoE estimation model B.

Figure 2:
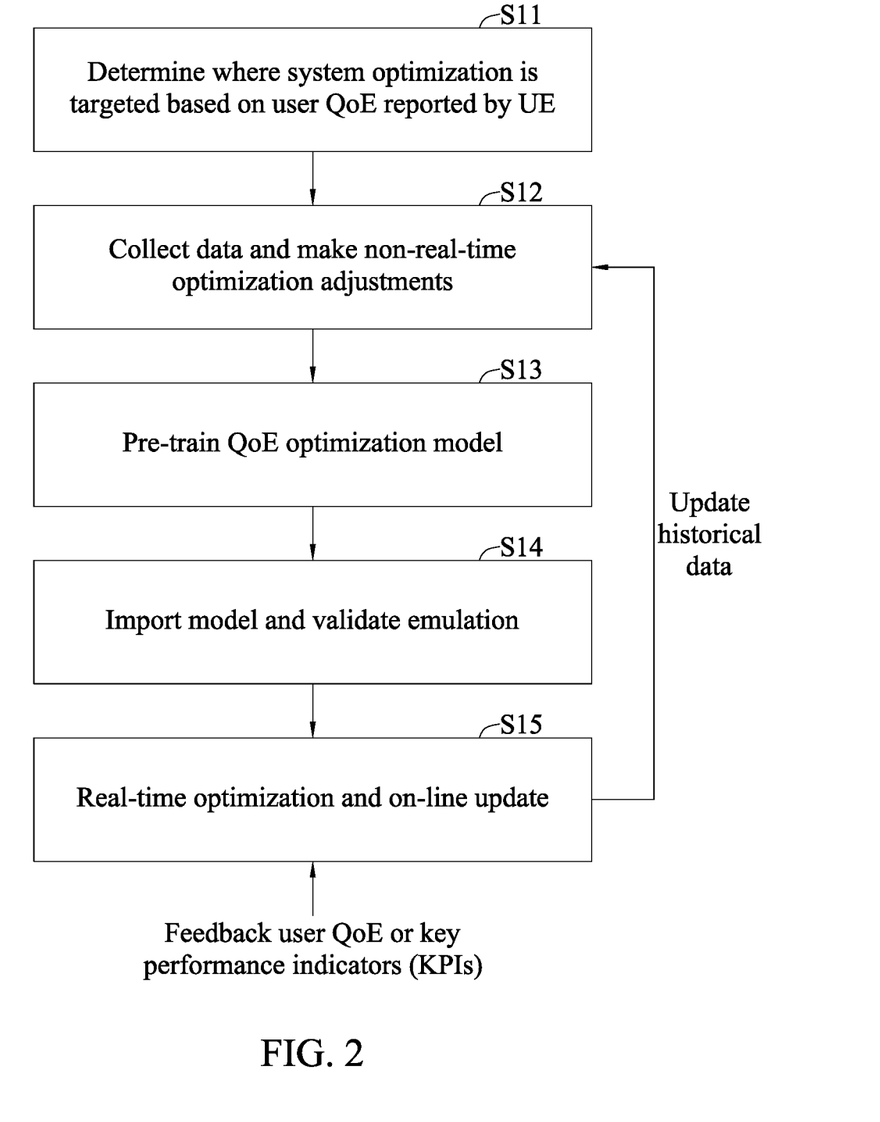
FIG. 2 is a flowchart illustrating a QoE optimization technique in the QoE optimization system and method in accordance with the present disclosure.
Figure 3:
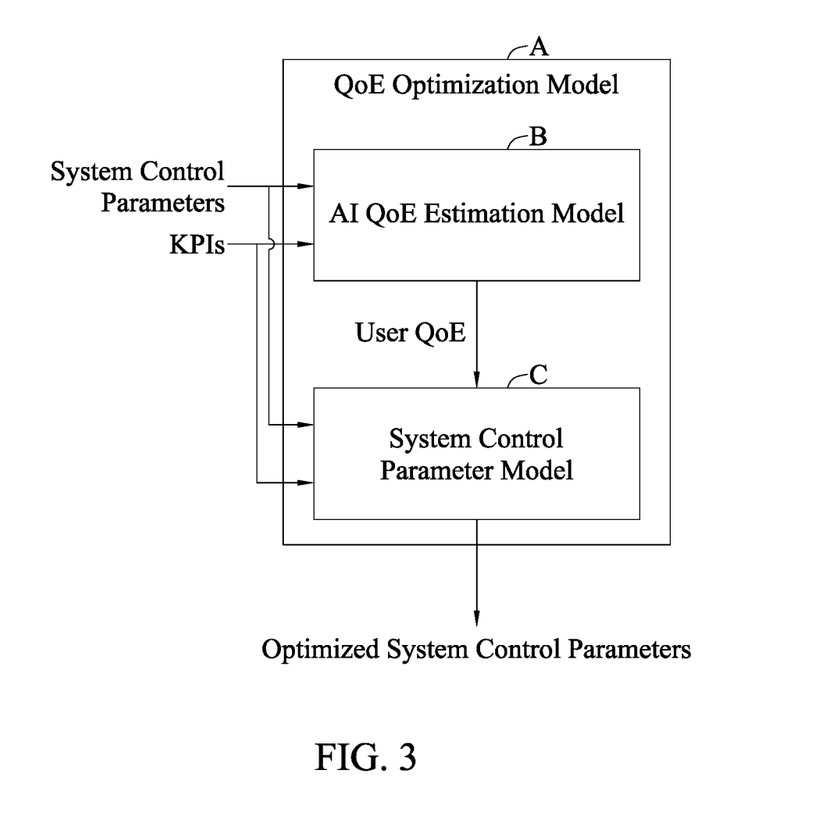
FIG. 3 is a schematic diagram illustrating a QoE optimization model in the QoE optimization system and method in accordance with the present disclosure.

FIG. 2 is a flowchart illustrating a QoE optimization technique in the QoE optimization system 1 and method in accordance with the present disclosure. FIG. 3 is a schematic diagram illustrating the QoE optimization model A in the QoE optimization system 1 and method in accordance with the present disclosure. Descriptions are given below with reference to FIGS. 1 to 3. The QoE optimization technique can be divided into first, second and third stages.

As shown in step S11 of FIG. 2, based on the user QoE returned by the user (UE 60), system optimization direction (e.g., where optimization of system control parameters is targeted) is determined.

First Stage: as shown in steps S12 and S13 of FIG. 2, the electronic device 10 (the QoE optimization module 11) collects data and makes non-real-time optimization adjustments to the QoE optimization model A configured to output optimized system control parameters, and the core network server 41 pre-trains the QoE optimization model A.

In the first stage, a user can send the service items being used along with the corresponding user experience data to the QoE optimization module 11 (the QoE optimization model A) of the electronic device 10 via the UE 60. The QoE optimization module 11 of the electronic device 10 can collect raw KPIs (e.g., CQI/network load indicators) and system control parameters from each of the core network 40, the base station 50 and the UE 60, and the system control parameters are adjusted through trial-and-error method or expert knowledge, thereby maximizing the user QoE with respect to the specific service or realizing the optimum user QoE. Then, the electronic device 10 can classify the type of the user service provided by the UE 60, and store the user QoE, the KPIs (e.g., CQI/network load indicators) and the system control parameters to which the user service type corresponds into a storage module (not shown) of the core network server 41 as historical data for subsequent learning by the QoE optimization model A. The storage module can be a storage medium or storage space, such as a database, a hard drive, a memory, or a register.

The QoE optimization model A shown in FIG. 3 includes a first part and a second part. The first part is the AI QoE estimation model B, and the second part is a system control parameter model C. The electronic device 10 (the QoE optimization module 11) uses the collected KPIs and system control parameters (e.g., raw system control parameters) as inputs for the AI QoE estimation model B, and the user QoE to which the KPIs and the system control parameters correspond in the historical data is used as an output for the AI QoE estimation model B. During training of the QoE optimization model A, the AI QoE estimation model B learns complicated non-linear mapping of the KPIs/system control parameters with respect to the user QoE for the aforementioned service.

Next, the electronic device 10 (the QoE optimization module 11) uses the user QoE outputted by the AI QoE estimation model B and the KPIs (e.g., CQI/network load indicators) and the system control parameters corresponding to the user QoE as a feature vector, which is used as an input for the system control parameter model C. The electronic device 10 (the QoE optimization module 11) then compares the output from the system control parameter model C with the corresponding optimum system control parameters in the historical data to obtain optimized system control parameters. Furthermore, the electronic device 10 (the QoE optimization module 11) can calculate a loss function of the AI QoE estimation model B, and can also update or adjust the parameters of the AI QoE estimation model B using the model update algorithm of the model update module 12, such that the AI QoE estimation model B is able to learn complicated non-linear mapping of the feature vector (e.g., system control parameters/KPIs/user QoE) to the optimum system control parameters.

The AI QoE estimation model B can be a regression model, in which cross-layer KPIs (e.g., CQI/network load indicators) and the system control parameters of the historical (past) continuous time are used as inputs for the AI QoE estimation model B, and the corresponding user QoE in the historical data returned by the user (UE 60) is used as an output (output answer) for the AI QoE estimation model B. Such a design allows the AI QoE estimation model B to learn complicated non-linear mapping of the system control parameters to the user QoE under different circumstances. For instance, not only can a fully connected network architecture be used by the AI QoE estimation model B, the architecture of a recursive neural network can also be utilized to enhance the extraction of temporal features.

The system control parameter model C can be a regression model. The output (output answer) for the system control parameter model C is the amount of adjustment for each system control parameter, and the amounts of adjustments for the system control parameters can be acquired by the QoE optimization technique executed by the core network server 41 in the core network 40. With regard to the input for the system control parameter model C, in addition to the cross-layer KPIs (e.g., CQI/network load indicators) and system control parameters, the user QoE estimated by the AI QoE estimation model B is also added as the basis for adjusting the system control parameters, such that the output of the system control parameter model C is optimized system control parameter.

The QoE optimization model A can include the AI QoE estimation model B and the system control parameter model C, the QoE optimization model A can also be formed by pre-training on historical data accumulated in the core network server 41 through end-to-end training. Moreover, the QoE optimization model A is exemplified by training of a single model, but in practice, a plurality of different QoE optimization models A can be trained by the core network server 41 based on the different types of user services or where system optimization is targeted (e.g., where optimization of system control parameters is targeted) and imported into the base station 50. During the on-line implementation stage, the selection module 13 selects at least one of the plurality of QoE optimization models A to be used.

Second Stage: as shown in step S14 of FIG. 2, model import and emulation validation are carried out. In the second stage, at least one or more QoE optimization models A pre-trained on historical data in the core network server 41 is emulated in a field F (e.g., a real field or a test field) using at least one of the base station emulator 20 and the UE emulator 30, and it is determined whether the execution result of the current QoE optimization model A in the field F (e.g., a real field or a test field) meets expectations based on real-time emulation data returned by the at least one of the base station emulator 20 and the UE emulator 30, and the result of the emulation by the at least one of the base station emulator 20 and the UE emulator 30 is then transmitted back to the QoE optimization module 11 (the QoE optimization model A) of the electronic device 10 to allow the QoE optimization module 11 of the electronic device 10 to make non-real-time optimization adjustments to the QoE optimization model A configured to output optimized system control parameters. As such, not only can historical data be updated using the emulation result from at least one of the base station emulator 20 and the UE emulator 30, the result of the AI QoE estimation model B in the QoE optimization model A can also be validated to see if it satisfies the requirements.

Third Stage: as shown in step S15 of FIG. 2, the field update module 14 performs real-time optimization and on-line update. In the third stage, the field update module 14 can import the plurality of QoE optimization models A pre-trained on historical data in the core network server 41 into each base station 50, and the selection module 13 selects one of the plurality of QoE optimization model A based on the real-time user service type (or where system optimization is targeted). Meanwhile, the feature vector consists of the KPIs and the system control parameters is used as an input for both the AI QoE estimation model B and the system control parameter model C in the QoE optimization model A, and it is determined whether the QoE optimization model A should be updated by referring to the result of the aforementioned stage where model import and emulation validation were performed. An optimum parameter adjustment method is then estimated using the QoE optimization model A in order to update the system control parameters to in turn, improve the user QoE.

If the user QoE is reported by the user (UE 60), then the user QoE reported by the user (UE 60) and its corresponding KPIs and system control parameters are recorded. The user QoE, the KPIs and the system control parameters are then transmitted back to the core network server 41 via the backhaul network of the base station 50, such that the pre-trained QoE optimization model A can be updated using the user QoE, the KPIs and the system control parameters.

Figure 4:
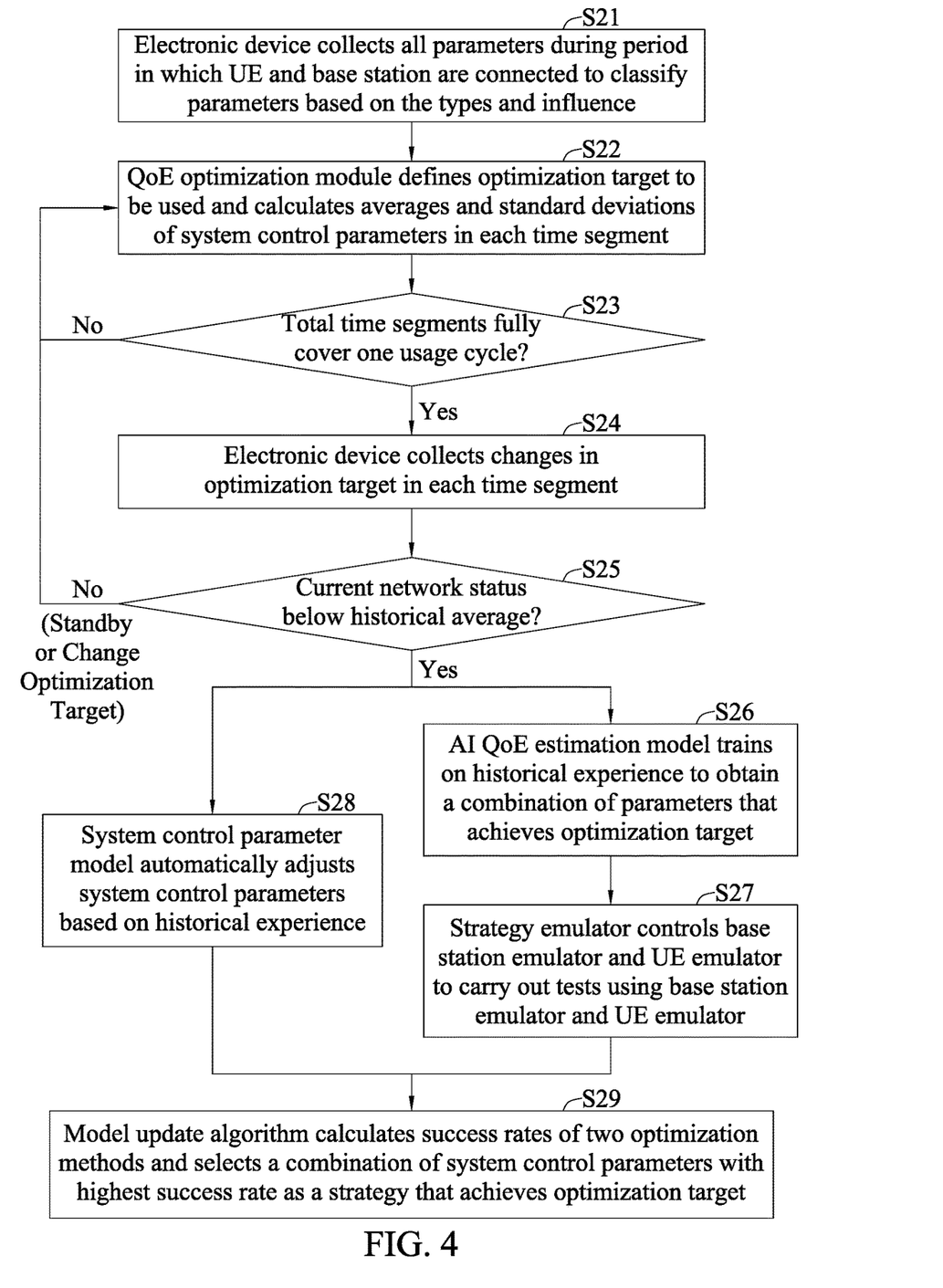
FIG. 4 is a flowchart illustrating the QoE optimization method in accordance with the present disclosure.
Figure 5:
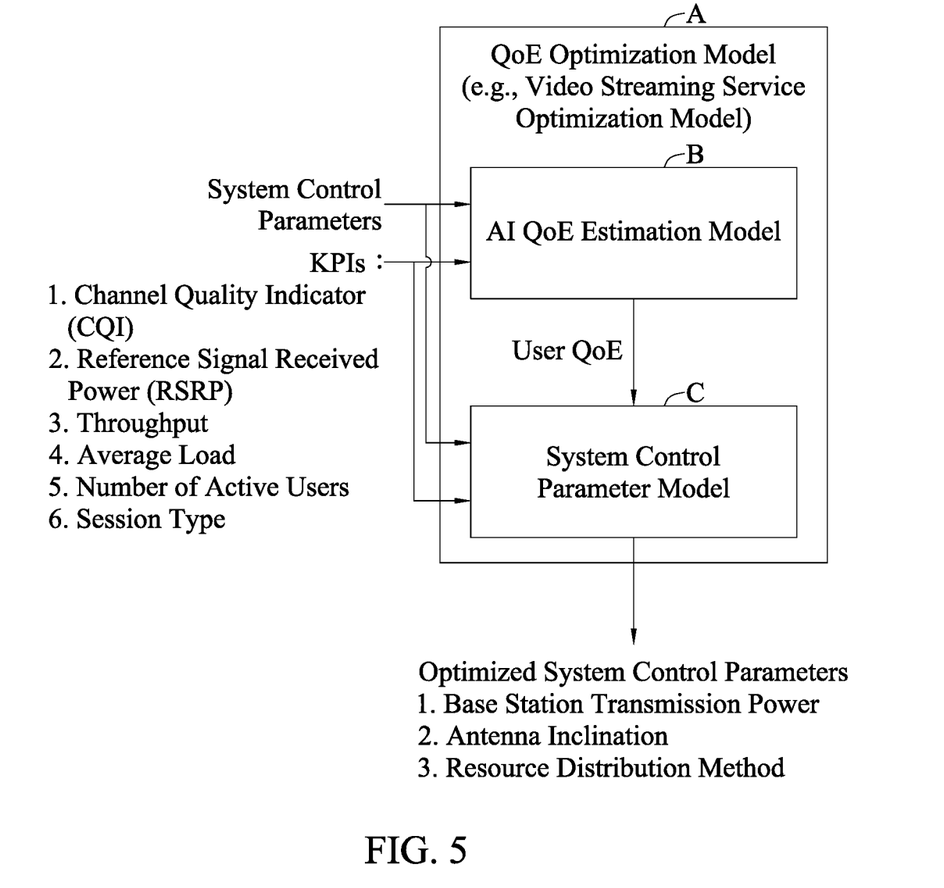
FIG. 5 is a schematic diagram depicting an embodiment in relation to the QoE optimization model in the QoE optimization system and method in accordance with the present disclosure.
Figure 6:
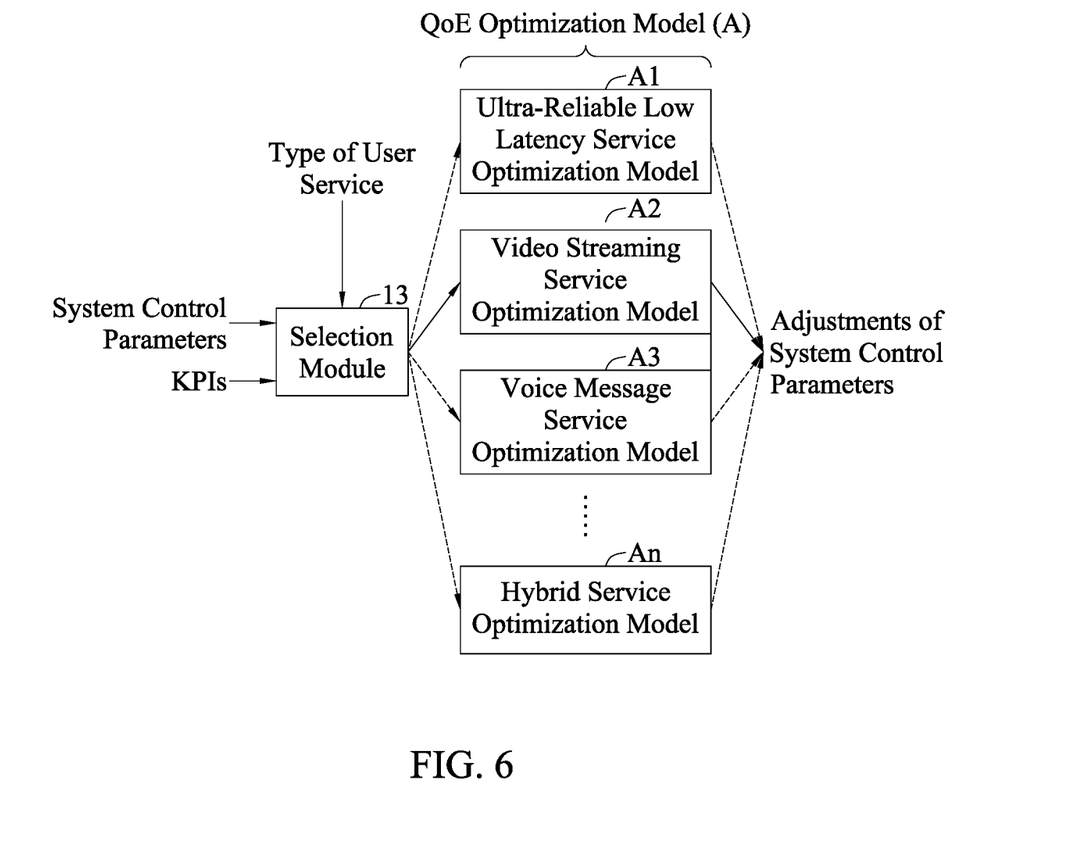
FIG. 6 is a schematic diagram depicting an embodiment in relation to a selection module for selecting one of a plurality of QoE optimization models in the QoE optimization system and method in accordance with the present disclosure.

FIG. 4 is a flowchart illustrating the QoE optimization method in accordance with the present disclosure. FIG. 5 is a schematic diagram depicting an embodiment in relation to the QoE optimization model A in the QoE optimization system 1 and the method in accordance with the present disclosure. FIG. 6 is a schematic diagram depicting an embodiment in relation to the selection module 13 for selecting one of a plurality of QoE optimization models A in the QoE optimization system 1 and the method in accordance with the present disclosure. Discussions below are provided with respect to FIGS. 4 to 6 as well as FIG. 1 at the same time.

As shown in step S21 of FIG. 4, as an example, a user (UE 60) is watching a high-definition (HD) video using a video software (e.g., YouTube), during the "data collection" stage, the electronic device 10 (the QoE optimization module 11) collects all of the parameters (e.g., KPIs and system control parameters) during the period in which the UE 60 and the base station 50 are connected, and all of the parameters are classified based on the types and influence of the parameters.

As shown in step S22 of FIG. 4, the QoE optimization module 11 (the QoE optimization model A) of the electronic device 10 defines the optimization target to be used is, for example, "high definition (HD)," and calculates the averages and the standard deviations of the system control parameters for the optimization target in each of the time segments and stores the averages and the standard deviations in a database (not shown).

As shown in step S23 of FIG. 4, the model update algorithm of the model update module 12 determines whether the time segments calculated by the QoE optimization module 11 (the QoE optimization model A) completely encompasses one usage cycle. If so (time segments completely covers one usage cycle), then proceed to step S24 of FIG. 4; else (time segments have not completely covered one usage cycle) return to step S22 of FIG. 4.

As shown in step S24 of FIG. 4, the electronic device 10 collects the changes in the optimization target in each of the time segments, and the model update algorithm (the model update module 12) of the electronic device 10 determines whether values for the current network status (e.g., current network speed, latency, etc.) are below the averages of the historical network status (e.g., historical average network speed or latency, etc.). If so (the values for the current network status are below the averages of the historical network status), then proceed to steps S26 and S28 of FIG. 4. If not (the values for the current network status are equal to or above the averages of the historical network status), then the field update module 14 goes into standby or the optimized target is changed. Then return to step S22 of FIG. 4.

Refer to FIG. 5, in the stage of "non-real-time optimization adjustment" and "pre-training of QoE optimization model A," the KPIs used by the core network server 41 include Channel Quality Indicator (CQI), Reference Signal Received Power (RSRP), throughput, the average load, number of active users, session type, etc., and the optimized system control parameters may include base station transmission power, antenna inclination, or resource distribution method, etc. For example, the QoE optimization module 11 of the electronic device 10 can adjust system control parameters by a trial-and-error method or expert knowledge to acquire optimized system control parameters (e.g., optimized base station transmission power, antenna inclination or resource distribution method) to in turn, obtain the optimum user QoE. These system control parameters are then used as the input and output for the QoE optimization model A suitable for video streaming service.

Referring to FIG. 6, if the QoE optimization module 11 of the electronic device 10 has met the adjustment requirements for the system control parameters, then the stage of "real-time optimization and on-line update" is entered into, wherein the selection module 13 selects one of a plurality of QoE optimization models A based on information about the type of a user service newly received.

As shown in steps S26 and S27 of FIG. 4, if historical or examples of adjustment strategies for the system control parameters are available, then the AI QoE estimation model B is trained on historical experience or adjustment strategies to obtain a combination of a plurality of system control parameters that achieves the optimization target. Then, the strategy emulator 15 converts the QoE optimization model A into control commands or control signals, so as to control at least one of the base station emulator 20 and the UE emulator 30 to test the QoE optimization model A using the at least one of the base station emulator 20 and the UE emulator 30.

As shown in step S28 of FIG. 4, the QoE optimization module 11 can also adjust the system control parameters automatically through the system control parameter model C based on historical experience.

As shown in step S29 of FIG. 4, the model update algorithm of the model update module 12 calculates the success rate or performance of the two optimization methods in steps S26-S27 and step S28 above (i.e., AI suggestion vs. historical experience) to select an optimum (e.g., having the highest success rate or performance) combination of a plurality of system control parameters as a strategy that achieves the optimization target.

In an embodiment, if no historical experience is available for reference, the AI QoE estimation model B can select one of a plurality of QoE optimization models A (e.g., video streaming service optimization model A2) shown in FIG. 6, and obtain optimized system control parameters depending on the real-time conditions to improve the user QoE.

Moreover, the QoE optimization models A shown in FIG. 6 includes an ultra-reliable low latency service optimization model A1, a video streaming service optimization model A2, a voice message service optimization model A3, . . . , a hybrid service optimization model. An, etc. Not only can a single service be optimized (e.g., an ultra-reliable low latency service of the ultra-reliable low latency service optimization model A1, a video streaming service of the video streaming service optimization model A2, or a voice message service of the voice message service optimization model A3), the QoE optimization models A can also train on hybrid services (e.g., a hybrid service of the hybrid service optimization model. An), such as a specialized model with 30% ultra-reliable low latency service, 40% video streaming service, and 30% voice message service (that is, the hybrid service of the hybrid service optimization model An).

In summary, the QoE optimization system and method in accordance with the present disclosure includes at least the following features, advantages or technical effects.

1. The present disclosures aims to improve quality of experience for users by taking into consideration the KPIs and the system control parameters. The QoE optimization model can also be pre-trained.

2. The strategy emulator of the present disclosure is capable of converting the QoE optimization model into control commands or control signals for controlling at least one of the base station emulator and the UE emulator. Emulation validation or cross validation of at least one of the base station emulator and the UE emulator can be employed to substantially reduce the uncertainties otherwise brought about by conventional direct adjustments of the system control parameters.

3. The present disclosure is capable of collecting data using the QoE optimization model and making non-real-time optimization adjustments to the QoE optimization model. The AI QoE estimation model is capable of using KPIs and system control parameters as input and the corresponding user QoE in the historical data as output. The system control parameter model is capable of providing optimized system control parameters.

4. When the telecommunications industry introduces new telecommunications equipment, in addition to initially requiring the system integration industry to provide telecommunications equipment and test reports, after the actual deployment is completed, in the events of temporary increase in demand and periodic audits by relevant authorities, the QoE optimization system and method of the present disclosure can be employed to make sure the associated technical details meet expectations, thereby improving the QoE for users.

5. The present disclosure is capable of providing a complete testing mechanism to the testing and verification industry with integrated tests from bottom to top layers and cross comparisons, and providing an AI QoE estimation model to support the strategy emulator, such that the root causes of network problems can be quickly uncovered. Continuous improvement in the QoE of user services can be achieved based on relevant indicators of the user QoE.

6. In the continuous development of telecommunications network in the telecommunications industry and the system integration industry, for example, when a telecommunications network is combined with a management mechanism, such as a 5G (fifth generation mobile communication technology) private network, the present disclosure can be used for periodic validations of the performance of a field and/or tests for updated environment or new deployment of a field.

7. The present disclosure is suited to, for example, the advent of the 5G private network as it is capable of providing a management and control mechanism that improves the qualities of applications as well as providing reliability and stability for a 5G private network before and after an update.

The above embodiments are set forth to illustrate the principles, features and technical effects of the present disclosure, and should not be construed as to limit the present disclosure in any way. The above embodiments can be modified or changed by one of ordinary skill in the art without departing from the spirit and scope of the present disclosure. Any equivalent modifications and changes made in light of the disclosures herein should be encompassed by the appended claims. Therefore, the scope of the present disclosure should be delineated by the claims.

What is claimed is:

1. A quality of experience (QoE) optimization system, comprising:
   an electronic device including at least one QoE optimization model and configured for collecting key performance indicators (KPIs) and system control parameters from a core network, a base station and a user equipment (UE), inputting the KPIs and the system control parameters from the core network, the base station and the UE into the QoE optimization model, and optimizing the system control parameters based on the KPIs from the core network, the base station and the UE and a user QoE fed back by the UE using the QoE optimization model for outputting optimized system control parameters; and
   a strategy emulator, a base station emulator and a UE emulator each respectively connected or in communication with the electronic device including the QoE optimization model, the strategy emulator configured for controlling the base station emulator and the UE emulator to emulate the QoE optimization model used for outputting the optimized system control parameters in the electronic device using the base station emulator and the UE emulator, and making non-real-time optimization adjustments to the QoE optimization model used for outputting the optimized system control parameters based on a result of the emulation of the QoE optimization model performed by the base station emulator and the UE emulator.

2. The QoE optimization system of claim 1, wherein the KPIs include channel quality indicator (CQI), reference signal received power (RSRP), throughput, average load, number of active users, or session type, wherein the system control parameters include base station transmission power, antenna inclination, or resource distribution method, and wherein the electronic device adjusts the system control parameters via a trial-and-error method or expert knowledge.

3. The QoE optimization system of claim 1, wherein the QoE optimization model includes an artificial intelligence (AI) QoE estimation model, the electronic device includes a model update algorithm, the electronic device calculates a loss function of the AI QoE estimation model, and updates or adjusts parameters of the AI QoE estimation model using the model update algorithm.

4. The QoE optimization system of claim 1, wherein the QoE optimization model includes an artificial intelligence (AI) QoE estimation model and a system control parameter model, the electronic device takes both a user QoE outputted by the AI QoE estimation model and the KPIs and the system control parameters corresponding to the user QoE as a feature vector to be used as inputs for the system control parameter model, and compares an output of the system control parameter model with optimum system control parameters in corresponding historical data to obtain the optimized system control parameters.

5. The QoE optimization system of claim 1, wherein the electronic device includes a field update module and a selection module, the field update module is configured for importing a plurality of QoE optimization models pre-trained on historical data in a core network server into the base station, and the selection module selects one of the plurality of QoE optimization models based on types of a real-time user service.

6. The QoE optimization system of claim 1, wherein the electronic device is further configured for defining an optimization target to be used to calculate averages and standard deviations of the system control parameters for the optimization target in each time segment, collecting changes in the optimization target in each of the time segments, determining whether a value of a current network status is lower than an average of a historical network status using a model update algorithm of the electronic device, and updating the optimization target if the value of the current network status is not lower than the average of the historical network status.

7. A quality of experience (QoE) optimization method, comprising:
   collecting key performance indicators (KPIs) and system control parameters from a core network, a base station and a user equipment (UE);
   inputting the KPIs and the system control parameters from the core network, the base station and the UE into at least one QoE optimization model;
   optimizing the system control parameters based on the KPIs from the core network, the base station and the UE and a user QoE fed back by the UE using the QoE optimization model for outputting optimized system control parameters;
   controlling, by a strategy emulator, a base station emulator and a UE emulator to emulate the QoE optimization model for outputting the optimized system control parameters using the at least one of the base station emulator and the UE emulator; and
   making non-real-time optimization adjustments to the QoE optimization model for outputting the optimized system control parameters based on a result of an emulation of the QoE optimization model performed by the base station emulator and the UE emulator.

8. The QoE optimization method of claim 7, further comprising using the KPIs and the system control parameters as inputs for an artificial intelligence (AI) QoE estimation model in the QoE optimization model, and using the user QoE in historical data corresponding to the KPIs and the system control parameters as an output for the AI QoE estimation model, wherein during training of the QoE optimization model, the AI QoE estimation model learns complicated non-linear mapping of the KPIs and the system control parameters with respect to the user QoE.

9. The QoE optimization method of claim 7, wherein the QoE optimization model includes a system control parameter model of a regression model, and outputs of the system control parameter model are amounts of adjustments for the system control parameters that are obtained by executing a QoE optimization technique by a core network server arranging in the core network.

10. The QoE optimization method of claim 7, further comprising emulating the QoE optimization model using the base station emulator and the UE emulator to determine an execution result of the QoE optimization model based on real-time information on the emulation returned by the base station emulator and the UE emulator, and returning the result of the emulation of the base station emulator and the UE emulator to an electronic device, such that the electronic device makes the non-real-time optimization adjustments to the QoE optimization model.

* * * * *